Oct. 13, 1931.  S. A. GLYNN  1,827,286
TRAIN PIPE COUPLING AND VALVE ARRANGEMENT
Filed July 12, 1927
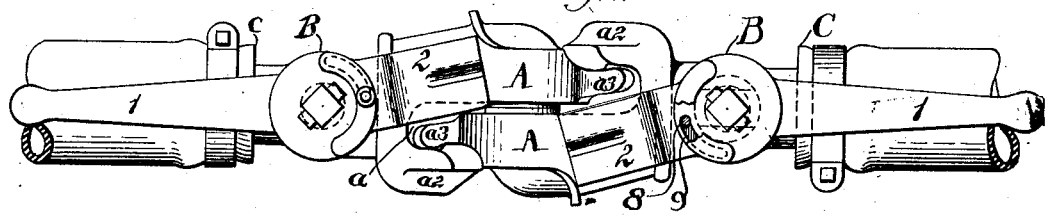
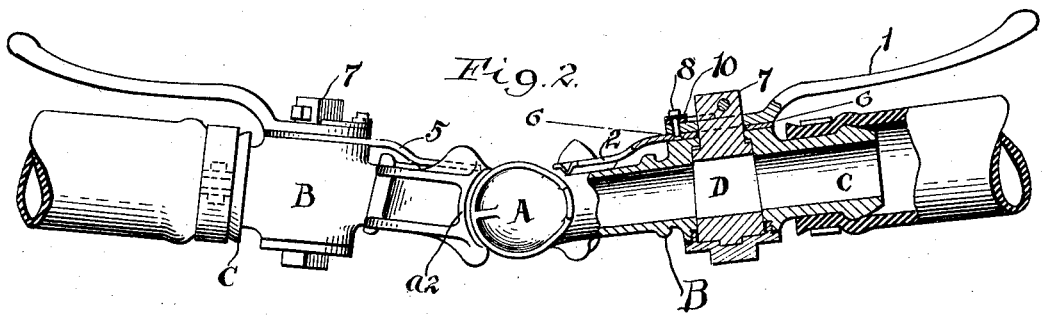
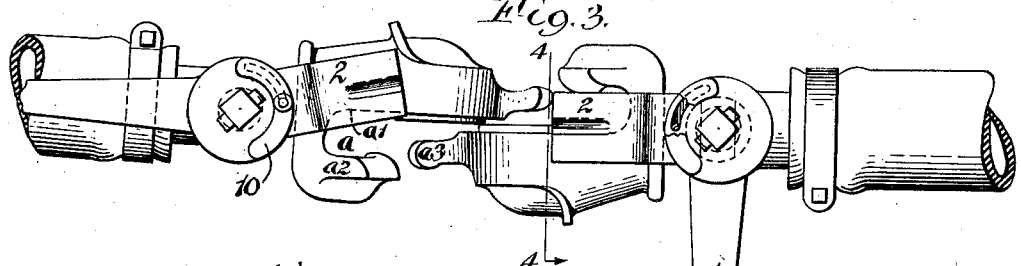
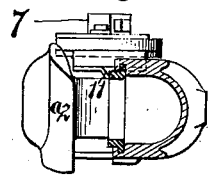
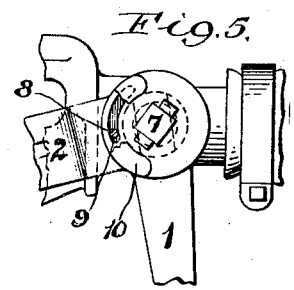
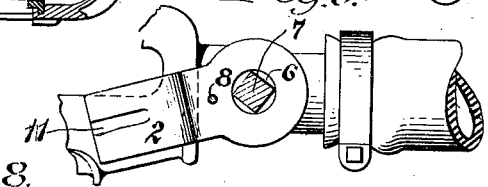
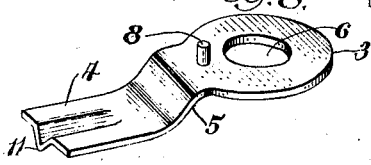
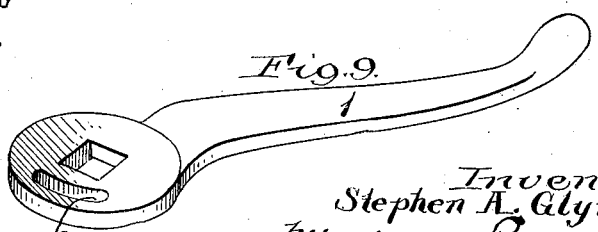
Inventor
Stephen A. Glynn
by Poppant Puros.
Attorneys Patented Oct. 13, 1931

1,827,286

UNITED STATES PATENT OFFICE

STEPHEN A. GLYNN, OF GARDENVILLE, NEW YORK, ASSIGNOR OF ONE-HALF TO WILLIAM J. DAETSCH, OF BUFFALO, NEW YORK

TRAIN PIPE COUPLING AND VALVE ARRANGEMENT

Application filed July 12, 1927. Serial No. 205,166.

This invention relates to improvements in combined train pipe couplings and valves.

The principal objects of this invention are to provide a compact organization of coupling members and valves for air brake systems of trains wherein the air line valves are inaccessible when the train is in motion and are readily accessible when the train is at rest, wherein the valve operating elements may be observed at all times and which compels an open or clear air line when cars are coupled together.

These objects are attained by embodying the coupling member and air line valve, at each end of the car, in a single unit located at the end of the air hose or line and which is constructed to provide a delayed acting tail piece co-operating with the coupling member and valve to compel the full opening of the valve of the opposed coupling member, whereby before the coupling members can be connected together, the valves of both must be in open positions.

In the accompanying drawings:—

Fig. 1 is a top plan view of the coupling members in coupled relation and the valves in open positions with the tail pieces in their normal positions.

Fig. 2 is a side view of the same with one valve and its tail piece in section.

Fig. 3 is a top plan view showing the coupling members in opposed relation but uncoupled, with one valve open and the other closed and with the tail piece of the closed valve member in position to prevent coupling.

Fig. 4 is a sectional view along the line 4—4 of Fig. 3.

Fig. 5 is a fragmentary view showing the valve handle turned towards closed position to the point where it is about to engage and move the tail piece.

Fig. 6 is a sectional view along the line 6—6 of Fig. 2.

Fig. 7 is a perspective view of the element which covers the slotted portion of the valve handle to keep it free from dirt.

Figs. 8 and 9 are perspective views of the tail piece and valve handle respectively.

Each unit includes essentially a coupling element and a valve combined therewith. The coupling element may be of any suitable or standard construction and consists of an engaging head A, a tubular shank B carrying said head and a hose connection C at the end of the shank remote from the head. The valve member D which may be of any suitable construction such as a turning plug, is mounted in the shank B. The valve is operated by a suitable externally mounted handle 1 and, according to the invention, means also operated or controlled by said handle, is provided for preventing the coupling engagement of the units if the valve of either unit is in any except full open position. Said means comprises an element 2 made of resilient metal, preferably sheet steel. This element which in its relation to the valve operating handle may be termed a tail piece is integrally formed with a hub portion 3 and a working portion 4 offset from the hub portion by a bend as 5. The hub is provided with an aperture 6 whereby it may be loosely mounted on the valve stem 7 and located between the shank D and valve handle 1. Said hub is also provided with a pin 8 which projects through and co-operates with a slot 9 in the hub of handle 1 to limit the movement of the tail piece to periods of the movements of said handle in opening or closing the valve. A curved element 10 is secured to the end of pin 8 and functions as a cover for the slot 9 to keep it free from dirt. The working end of the tail piece is formed with a longitudinal cam faced projection 11 which operates to prevent movement of the tail piece by the friction between the same and the handle.

The units are shown in coupled relation, in Fig. 1, with both valves in normal, i. e. full open position and both tail pieces in their corresponding normal or offset positions, that is to say the positions to which they are moved when the valves are moved to full open positions. When it is desired to uncouple the units, the valves in accordance with the usual practice, are moved to their closed positions by means of their handles. It is noted that each handle must be turned through an arc corresponding to the length of its slot before the pin of the corresponding tail piece is engaged by the end of said slot, and thus said tail piece is moved only during the final period of the closing movement of the handle. In this manner the closing of each valve results in a movement of the corresponding tail piece to what may be termed a central position in which it extends longitudinally over the recess of the corresponding coupling head, that is to say over the space $a$ between the body portion $a'$ and coupling jaw $a^2$ of the head, in which space the forward lip $a^3$ of the opposing head is held when the units are coupled. The valves and tail pieces having been thus operated, the units are uncoupled in the usual way, and as the forward lip of each head is withdrawn from the recess of the opposed head, it will strike the tail piece over that recess and spring it away from the same sufficiently to permit the complete withdrawal of the forward lip whereby they are uncoupled. When the forward lips disengage the tail pieces, they will return to their normal central positions due to their resilience.

In actual practice the brakeman of the train sometimes fails to open the air valves or angle cocks after recoupling the cars whereby that portion of the air line from such coupling to the rear of the train is isolated from the rest of the line and in such isolated section the brakes are inoperative. This invention eliminates the possibility of such failure by compelling both valves to be turned to their full open position before the units can be recoupled. With either valve closed, the corresponding tail piece is in central position and if at such time recoupling is attempted said tail piece will obstruct the recess over which it extends to prevent the entry into the same of the forward lip of the opposed head thus positively preventing the re-coupling. In order to move the tail pieces to their offset or inoperative position, the valves must be opened and due to the delayed acting means, they must be opened full since movement to partially open position will not effect a movement of the tail pieces. Hence upon movement of the valves to full or wide open positions, the tail pieces are moved to their corresponding offset positions in which the coupling may be effected in the usual manner.

The delayed action of the tail pieces is further insured by the cam faced projection on the tail pieces which are provided to prevent premature movement of the same as by friction between it and the handle. In central position, this projection extends into the space $a$ adjacent the head portion $a^1$, sufficiently to prevent such movement by friction while in offset position the cam abuts against the head $a^1$ with sufficient force to prevent such movement.

Having fully described my invention, I claim:—

1. A coupling unit for air brake systems comprising companion cooperating units provided with an air passage, said unit being formed with a coupling head having a recess and with an air line connecting portion in combination with a valve mounted in said connecting portion and having a stem, an operating handle fitted on said stem, a tail piece associated with said handle and movable to either of two positions in accordance with the movement of said handle to open or close said valve, said tail piece when moved to a position corresponding to the closed position of said valve being operative to prevent the coupling of said heads but being yieldable to permit uncoupling of said heads when the tail piece is in said closed position.

2. A coupling unit for air brake systems comprising companion cooperating units provided with an air passage, said unit being formed with a coupling head having a recess and with an air line connecting portion in combination with a valve mounted in said connecting portion and having a handle for operating said valve to open or closed position, an element for obstructing said recess movable to corresponding positions and delayed acting means connecting said handle and element whereby a movement of the handle to one position will effect a corresponding movement of the element only in the latter portion of the travel of said handle to said position.

3. A coupling unit for air brake systems comprising companion cooperating units provided with an air passage, said unit being formed with a coupling head having a recess and with an air line connecting portion in combination with a valve mounted in said connecting portion and having an operating handle provided with a slot and a tail piece for obstructing said recess having a pin which projects through and coacts with said slot to form a delayed acting means connecting said handle and tail piece whereby when said handle is moved to open or close said valve the tail piece will move with said handle only during the latter portion of the travel of said handle from one position to another.

4. A coupling unit for air brake systems comprising companion cooperating units provided with an air passage, said unit being formed with a coupling head having a recess and with an air line connecting portion in combination with a valve mounted in said connecting portion and having an operating handle, a tail piece adjacent said handle for obstructing said recess, delayed acting means connecting said handle and tail piece whereby movement of the handle to open or close the valve will effect a corresponding movement of said tail piece only during the latter portion of the travel of said handle to such position and additional means associated with said tail piece to prevent its movement by friction during the initial portion of the travel of said handle to such position.

5. A coupling unit for air brake systems comprising companion cooperating units provided with an air passage, said unit being formed with a coupling head having a recess and with an air line connecting portion in combination with a valve mounted in said connecting portion and having a handle for operating said valve to open or closed position, and an element for obstructing said recess operated by said handle to be positioned over said recess when the valve is closed, said element when in this position preventing the coupling of said coupling units but permitting their uncoupling.

In testimony whereof I affix my signature.

STEPHEN A. GLYNN.